US012725973B2

(12) United States Patent
Lee

(10) Patent No.: US 12,725,973 B2
(45) Date of Patent: Sep. 1, 2026

(54) SAFETY OUTLET HAVING SWITCH FUNCTION

(71) Applicant: Jong Ho Lee, Changwon-si (KR)

(72) Inventor: Jong Ho Lee, Changwon-si (KR)

( * ) Notice: Subject to any disclaimer, the term of this patent is extended or adjusted under 35 U.S.C. 154(b) by 317 days.

(21) Appl. No.: 18/711,605

(22) PCT Filed: Apr. 26, 2024

(86) PCT No.: PCT/KR2024/005717
§ 371 (c)(1),
(2) Date: May 19, 2024

(87) PCT Pub. No.: WO2024/242351
PCT Pub. Date: Nov. 28, 2024

(65) Prior Publication Data
US 2026/0171721 A1 Jun. 18, 2026

(30) Foreign Application Priority Data
May 19, 2023 (KR) ........................ 10-2023-0065116

(51) Int. Cl.
*H01R 13/639* (2006.01)
*H01R 13/447* (2006.01)
(Continued)

(52) U.S. Cl.
CPC ....... *H01R 13/6395* (2013.01); *H01R 13/447* (2013.01); *H01R 13/62* (2013.01); *H01R 2103/00* (2013.01)

(58) Field of Classification Search
CPC ....... H01R 13/10; H01R 13/11; H01R 13/111; H01R 13/15; H01R 13/17; H01R 13/18; H01R 13/187; H01R 13/193; H01R 13/20; H01R 13/22; H01R 13/24; H01R 13/436; H01R 13/4364; H01R 13/44; H01R 13/447; H01R 13/4532; H01R 13/46; H01R 13/629; H01R 13/112; H01R 3/00;
(Continued)

(56) References Cited

U.S. PATENT DOCUMENTS

| | | | | |
|---|---|---|---|---|
| 2011/0256745 A1* | 10/2011 | Shin | H01R 13/4532 439/136 | |

FOREIGN PATENT DOCUMENTS

| | | | | |
|---|---|---|---|---|
| JP | 2017010652 A * | 1/2017 | | |
| KR | 20160024739 A * | 3/2016 | H01R 13/4538 | |

(Continued)

*Primary Examiner* — Anthony R Jimenez
(74) *Attorney, Agent, or Firm* — Maschoff Brennan

(57) ABSTRACT

Provided is a safety outlet having a switch function. The safety outlet includes a housing coupling body having a pin through hole into which a plug pin is inserted and having an inner portion provided with a module arrangement space in communication with the pin through hole, and includes a safety switch module being disposed in the module arrangement space and being configured to be rotated in a first direction by being in contact with the plug pin and by being pressed, thereby opening an insertion path of the plug pin. Furthermore, the safety outlet includes a switch elastic member providing an elastic force such that the safety switch module is rotated in a second direction so as to block the insertion path, and includes a power terminal disposed outside the safety switch module from inside the housing coupling body and connected to an external power source.

5 Claims, 12 Drawing Sheets

(51) Int. Cl.
*H01R 13/62* (2006.01)
*H01R 103/00* (2006.01)

(58) Field of Classification Search
CPC . H01R 4/48; H01R 4/484; H01R 4/56; H01R 4/60; H01R 9/00; H01R 9/03; H01R 9/22; H01R 11/00; H01R 11/01; H01R 11/03; H01R 11/16; H01R 11/22; H01R 13/6395; H01R 13/62; H01R 2103/00; H01R 4/4828; H01R 4/4816; H01R 24/20; H01R 13/639
USPC ........................................................ 200/51 R
See application file for complete search history.

(56) References Cited

FOREIGN PATENT DOCUMENTS

| | | | | | |
|---|---|---|---|---|---|
| KR | 101990113 | B1 * | 6/2019 | ............. | H01R 13/44 |
| KR | 102525666 | B1 * | 4/2023 | ............. | H01R 13/66 |

* cited by examiner

SAFETY OUTLET HAVING SWITCH FUNCTION

TECHNICAL FIELD

The present disclosure relates to a safety outlet having a switch function.

BACKGROUND ART

Generally, when electricity is used in an indoor space such as a home, an office, and so on, or when electricity is used in an outside space such as an outside work site, electricity is supplied by plugging a plug into an outlet which is mounted on a wall or which is provided in a power strip.

The outlet includes a general outlet which can be used by inserting an electric plug into the general outlet and which is provided in any place where electricity is used, such as inner or outer wall surfaces of a building, a ship, a train, an airplane, and so on, and includes an outlet which can be used by inserting an electric plug into the outlet and which is provided in a power strip and so on.

In a conventional outlet, an insertion port of a pin of a plug is always in an open state and is exposed to the outside in most cases while the conventional outlet is used, so that various foreign materials can easily penetrate inside the conventional outlet. That is, when the conventional outlet is used in a place where there is a lot of moisture or high humidity, there is a problem that a safety accident such as a short circuit or an electric shock occurs due to humidity or moisture penetrating inside the conventional outlet. In addition, there have been frequent cases of safety accidents occurring in the conventional outlet due to a metal object being inserted into holes into which pins of a plug are inserted.

Recently, in order to solve the problem of the conventional outlet, a safety-enhanced type outlet having a pin insertion port that is opened when a plug is mounted or having a waterproof function is developed.

In Korean Patent Application Publication No. 10-2005-0113133 that is the related art document, a safety outlet having a waterproof function and having a pin insertion port that is opened when a plug is mounted is disclosed.

However, in the safety outlet of the related art document, since the safety outlet has a structure in which a metal foreign material is caused to conduct current even when the metal foreign material is inserted into the pin insertion port, there is a problem that an electric shock accident due to the insertion of foreign materials is still not prevented.

In addition, in the safety outlet of the related art document, when water is introduced inside the pin insertion port in a state in which the pin insertion port is opened by insertion of a metal foreign material or in a state in which the pin insertion port is opened due to a malfunction of a blocking member configured to block the pin insertion port, the introduced water is not effectively discharged and a short circuit accident may occur.

Therefore, a new concept of a safety outlet which is capable of preventing an electric shock accident due to insertion of a foreign material and which is capable of effectively preventing an accident such as a short circuit even when liquid is introduced inside the safety outlet through a pin insertion port is required.

DISCLOSURE

Technical Problem

An objective of the present disclosure is to provide a safety outlet having a switch function, the safety outlet being configured such that current flow is realized only when a plug is inserted, thereby securing safety.

Another objective of the present disclosure is to provide a safety outlet having a switch function, the safety outlet being configured such that components for providing a safety function are modularized, thereby having a simple structure and being capable of easily manufacturing the safety outlet.

Still another objective of the present disclosure is to provide a safety outlet having a switch function, the safety outlet being configured such that liquid introduced inside the safety outlet is discharged, thereby being capable of preventing a short circuit or an electric shock.

Technical Solution

According to an embodiment of the present disclosure, there is provided a safety outlet having a switch function, the safety outlet including: a housing coupling body having a pin through hole into which a pin of a plug is inserted from above the pin through hole, the housing coupling body having an inner portion provided with a module arrangement space in communication with the pin through hole; a safety switch module disposed in the module arrangement space, the safety switch module being configured to be rotated in a first direction by being in contact with the pin of the plug and by being pressed, thereby opening an insertion path of the pin of the plug; a switch elastic member providing an elastic force such that the safety switch module is rotated in a second direction so as to block the insertion path; and a power terminal disposed outside the safety switch module from inside the housing coupling body and connected to an external power source, wherein the safety switch module includes: a rotating case having a pin insertion port which is open upward and into which the pin of the plug is inserted, having an upper surface provided with a rotation guiding inclined surface in contact with the pin insertion port, being initially positioned such that the rotation guiding inclined surface corresponds to the pin through hole, and being configured to be rotated in the first direction by contact between the pin of the plug and the rotation guiding inclined surface and by being pressed so that the pin insertion port corresponds to the pin through hole; and a conducting terminal member coupled to the rotating case and configured to be rotated together with the rotating case, the conducting terminal member having a first end which is positioned inside the pin insertion port and which is in contact with the pin of the plug that is inserted, the conducting terminal member having a second end which penetrates a side wall of the rotating case and which is positioned outside the rotating case, and the conducting terminal member being configured to be caused to conduct current by being in contact with the power terminal when the rotating case is rotated in the first direction.

In addition, a rotation guiding portion that protrudes along each edge circumference of the upper surface and a lower surface of the rotating case may be formed on the upper surface and the lower surface of the rotating case, a rotation guiding portion coupling portion coupled to the rotation guiding portion may be formed on an upper surface and a bottom surface of the module arrangement space, one of the rotation guiding portion and the rotation guiding portion coupling portion may be formed as a groove having a circular shape, and the other one of the rotation guiding portion and the rotation guiding portion coupling portion may be formed as a protrusion having a circular shape inserted into the groove.

In addition, the pin insertion port may be formed such that a plurality of pin insertion ports is formed corresponding to the number of pins of the plug and is formed vertically through the rotating case, the conducting terminal member may be provided such that a plurality of conducting terminal members is provided corresponding to the number of the plurality of pin insertion ports, a plurality of drainage flow paths partitioned from each other may be formed below the rotating case inside the housing coupling body, the plurality of pin insertion ports may be respectively in communication with the drainage flow paths different from each other, and the plurality of drainage flow paths may be open outside toward directions different from each other from a lower portion of the housing coupling body such that liquids introduced into the pin insertion ports different from each other do not in contact with each other.

In addition, the housing coupling body may include: a housing in which a lifting space that is open upward is formed and the module arrangement space is formed below the lifting space; a lifting plate provided in the lifting space such that the lifting plate is capable of being lifted, the lifting plate being configured to be lifted downward by being pressed by the plug when the plug is mounted, and the lifting plate having the pin through hole; and a supporting elastic member elastically supporting the lifting plate from inside the housing, the supporting elastic member being configured to be elastically deformed when the lifting plate is lifted downward, thereby providing an upward restoration force to the lifting plate.

In addition, the lifting plate may include: a lifting plate body portion having a plate shape and having the pin through hole formed through the lifting plate body portion; an extension portion that extends downward from a center of a lower surface of the lifting plate body portion; and an upper clutch portion formed on a lower portion of the extension portion and configured to realize a one-touch operation of the lifting plate, and an extension portion insertion port into which the extension portion is inserted when the lifting plate is lifted downward is formed on a center of the rotating case, and a clutch member interworking with the upper clutch portion so as to realize the one-touch operation of the lifting plate and repeating restraining of the upper clutch portion and releasing the restraining of the upper clutch portion according to a repeated pressing of the lifting plate is provided in the extension portion insertion port.

Advantageous Effects

The safety outlet having the switch function according to an embodiment of the present disclosure may have following effects.

The safety switch module is provided such that the safety switch module is rotated in the first direction by the contact between the plug pin and the safety switch module and by being pressed and opens the insertion path of the plug pin when the plug pin is inserted, and the safety switch module is provided such that the conducting terminal member in contact with the plug pin is in contact with the power terminal when the first direction rotation is performed, thereby realizing the current flow. Therefore, insertion of a foreign material is capable of being prevented and the current flow is realized only when the plug is mounted normally, so that safety may be significantly increased.

In addition, the safety switch module includes the rotating case having the pin insertion port and being configured to be rotated by being in contact with the plug pin, and includes the conducting terminal member coupled to the rotating case and configured to be rotated together with the rotating case, the conducting terminal member having the first end positioned in the pin insertion port such that the first end is in contact with the plug pin that is inserted. Accordingly, the safety switch module is provided as one module providing both a shutter function and a conducting switch function. Accordingly, a plurality of separate configurations for realizing the shutter function and the conducting switch function is not required, and a coupling structure with the housing is simplified. Therefore, assembly and manufacturing are capable of being more easily performed, and a risk of failure may be significantly reduced due to the simplification of the structure.

In addition, the plurality of drainage flow paths in communication with the pin insertion ports different from each other is formed at the lower portion of the housing, and the plurality of drainage flow paths is open outward in different directions. Therefore, even when liquids are introduced from outside through the pin insertion ports, the liquids are not in contact with each other, so that a short circuit accident caused by current flow of the liquids may be effectively prevented.

BEST MODE

Hereinafter, an embodiment of the present disclosure will be described in detail with reference to the accompanying drawings.

However, the spirit of the present disclosure is not limited to the presented embodiment, and by addition, modification, and removal of another component, other embodiments included within other degenerative inventions or the scope of the spirit of the present disclosure may be easily proposed.

Figure 1:
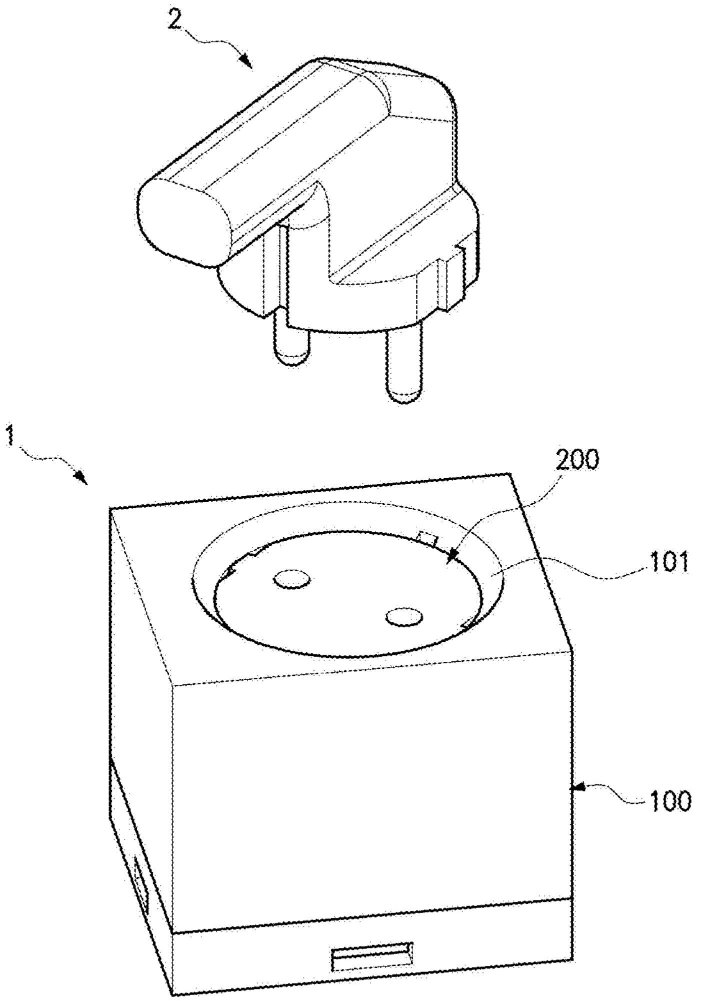
FIG. 1 is a perspective view illustrating a safety outlet according to an embodiment of the present disclosure.

FIG. 1 is a perspective view illustrating a safety outlet according to an embodiment of the present disclosure.

Figure 2:
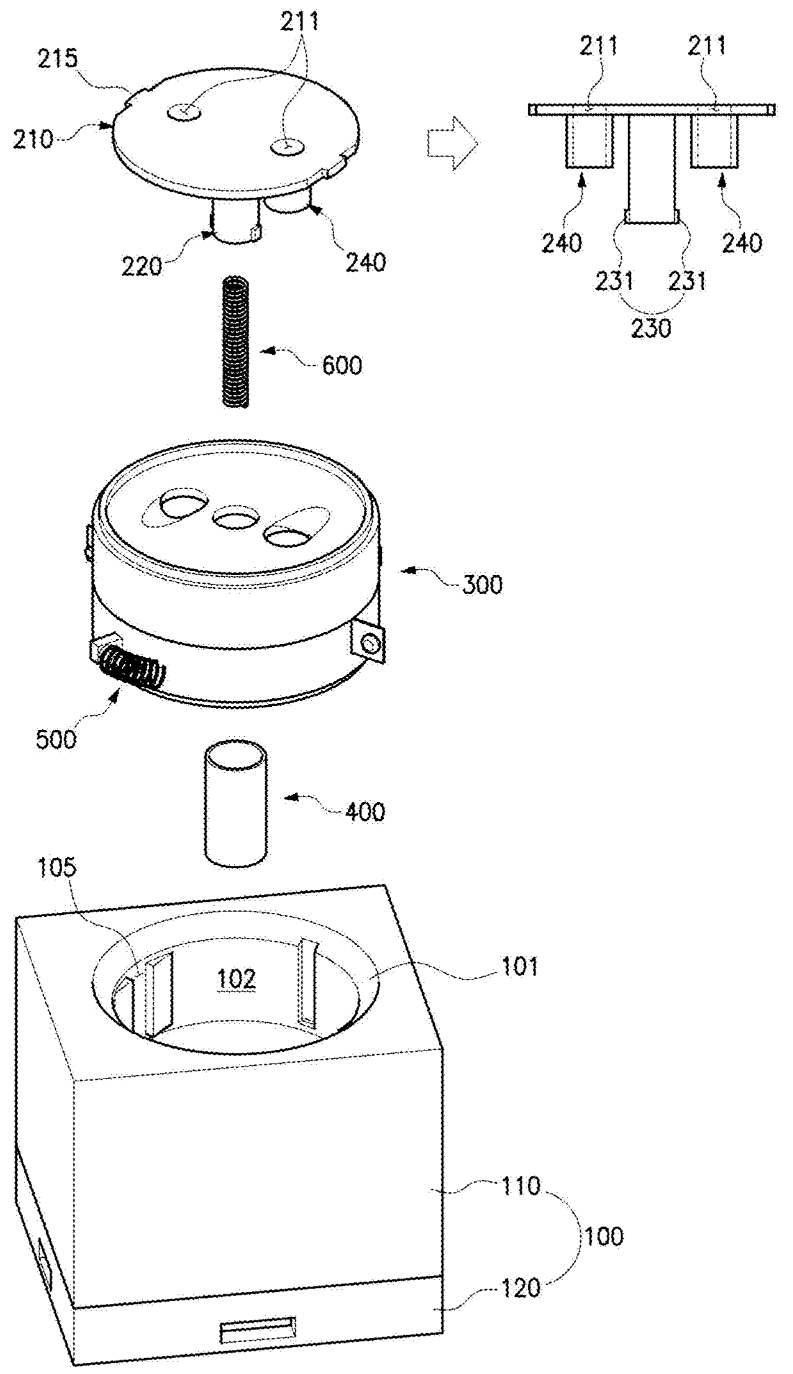
FIG. 2 is an exploded view illustrating the safety outlet according to an embodiment of the present disclosure.

FIG. 2 is an exploded perspective view illustrating the safety outlet according to an embodiment of the present disclosure.

Figure 3:
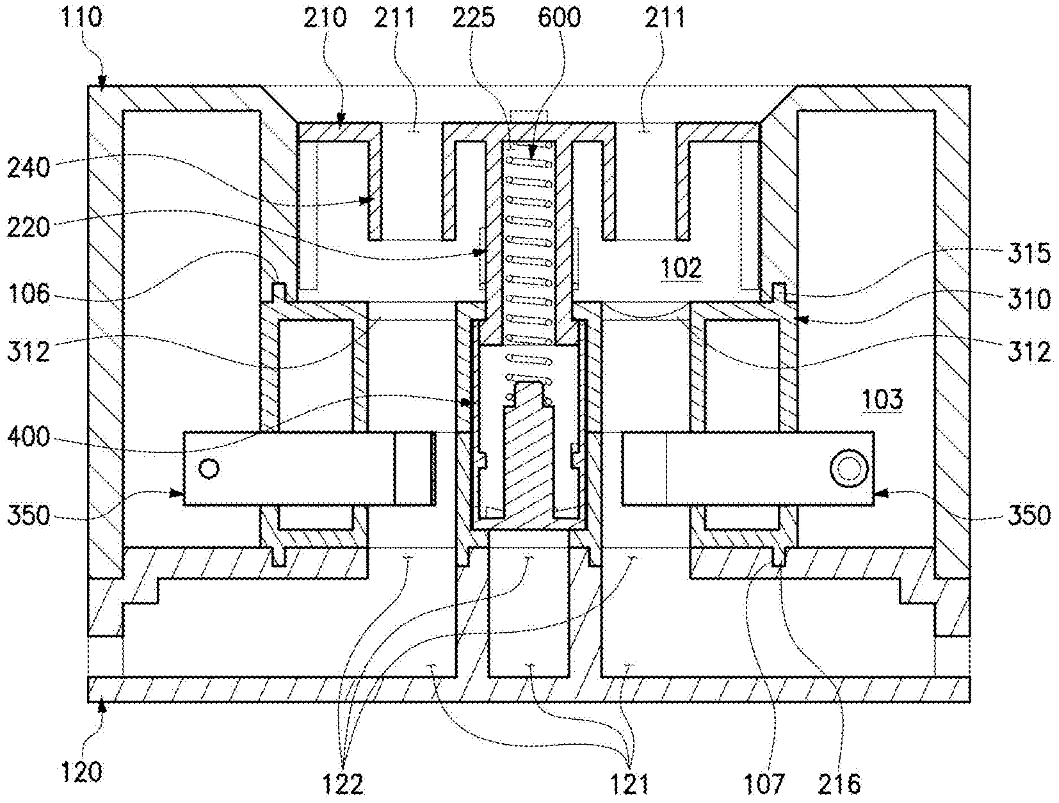
FIG. 3 is a cross-sectional view illustrating the safety outlet according to an embodiment of the present disclosure.

FIG. 3 is a cross-sectional view illustrating the safety outlet according to an embodiment of the present disclosure.

Figure 4:
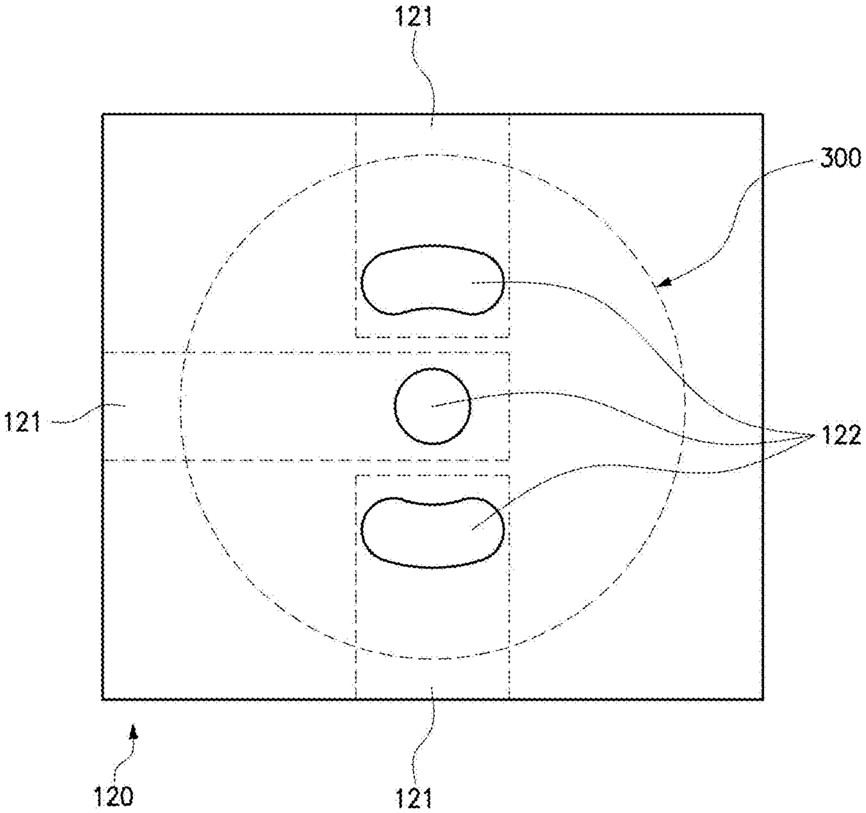
FIG. 4 is a view illustrating a drainage flow path of a lower housing according to an embodiment of the present disclosure.

FIG. 4 is a view illustrating a drainage flow path of a lower housing according to an embodiment of the present disclosure.

Figure 5:
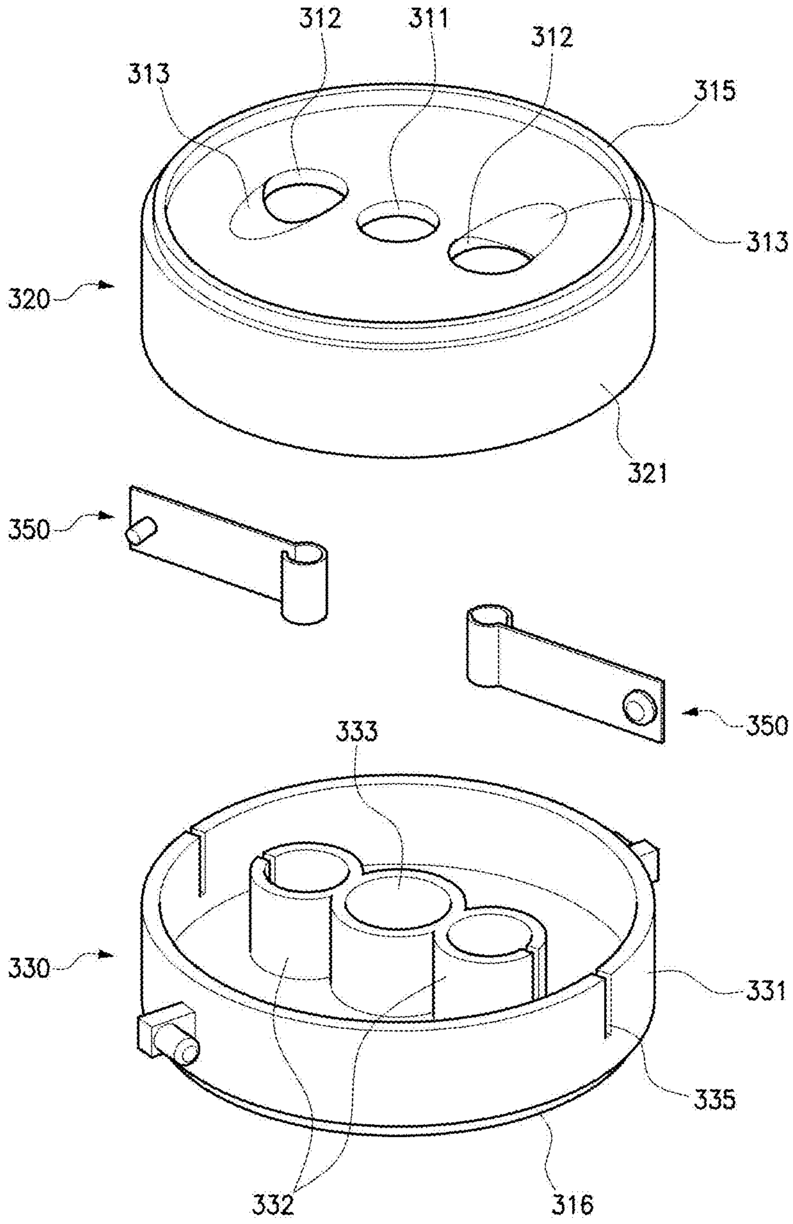
FIG. 5 is an exploded view illustrating a safety switch module according to an embodiment of the present disclosure.

FIG. 5 is an exploded perspective view illustrating a safety switch module according to an embodiment of the present disclosure.

Figure 6:
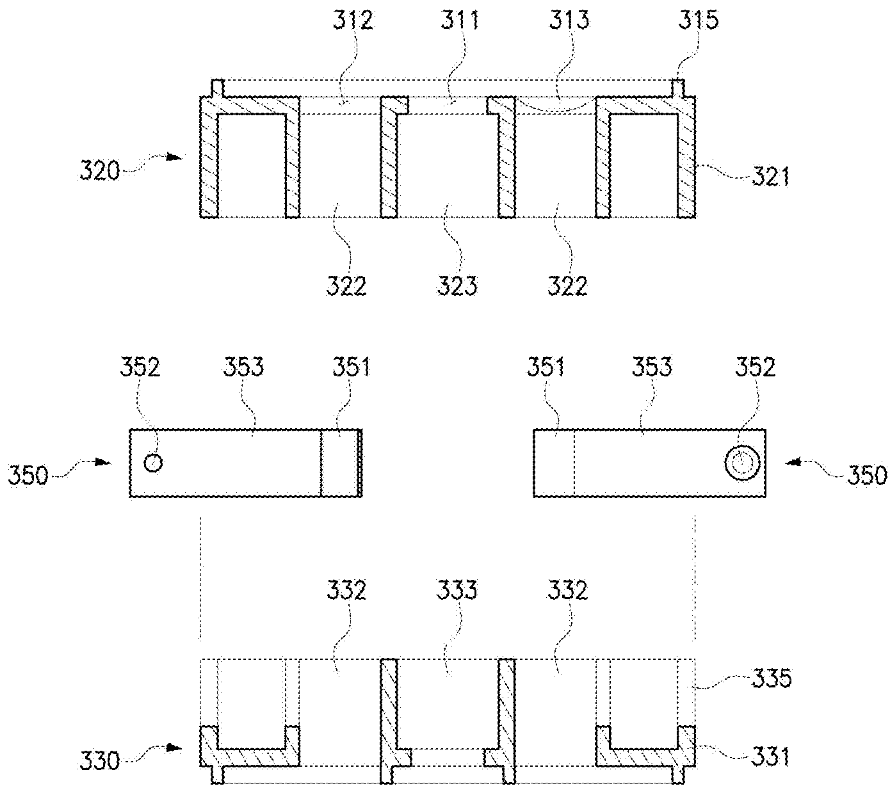
FIG. 6 is a cross-sectional view illustrating the safety switch module according to an embodiment of the present disclosure.

FIG. 6 is a cross-sectional view illustrating the safety switch module according to an embodiment of the present disclosure.

Figure 7:
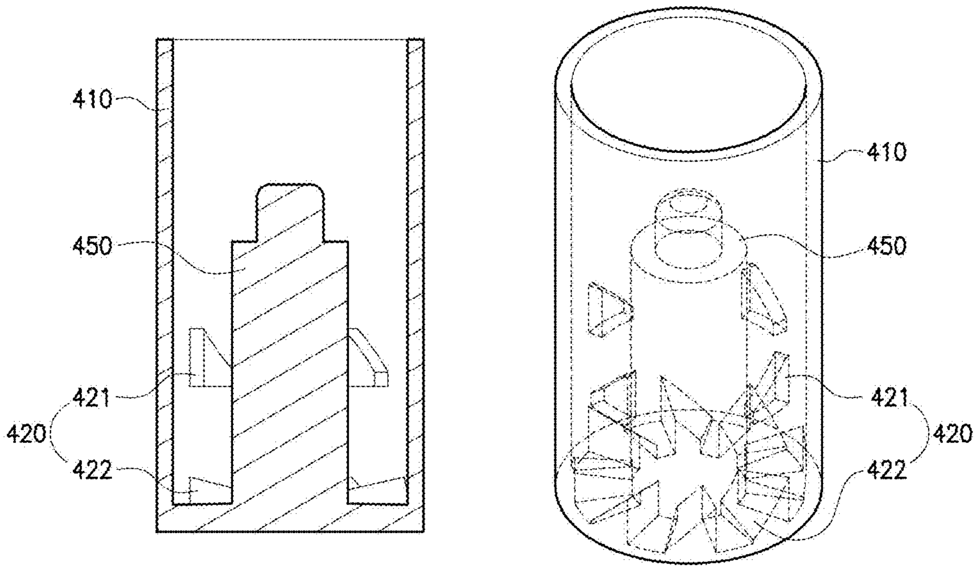
FIG. 7 is a cross-sectional view illustrating a clutch member according to an embodiment of the present disclosure.

FIG. 7 is a cross-sectional view illustrating a clutch member according to an embodiment of the present disclosure.

Figure 8:
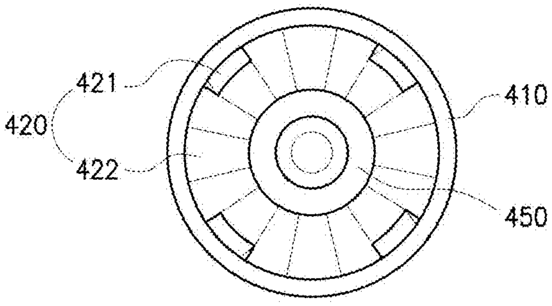
FIG. 8 is a plan view illustrating the clutch member according to an embodiment of the present disclosure.

FIG. 8 is a plan view illustrating the clutch member according to an embodiment of the present disclosure.

A safety outlet of the present disclosure includes a general outlet which is embedded in an inside wall or an outside wall of a building, or which is provided everywhere that uses electricity, such as a transportation means such as a vehicle, a passenger ship, a train, an airplane, or the like. In addition, the safety outlet of the present disclosure is a concept that includes all outlets provided in power strips used to overcome limited distances in electricity supply.

In addition, in the description of the present disclosure, a safety outlet in which one plug mounting portion is formed so that one plug is capable of being mounted is described as an example. However, the present disclosure is not limited thereto, and it may be possible that a plurality of plug mounting portions is formed so that a plurality of plugs is capable of being mounted. When the plurality of plug mounting portions is formed, internal configurations of the safety outlet to be described later may be configured such that the plurality of plug mounting portions performs the same function accordingly.

A plug 2 may be formed such that the plug 2 has a head formed such that a person is capable of holding the head, and may be formed such that the plug 2 has a plurality of pins which protrudes from the head and which is separated by polarity.

A safety outlet 1 having a switch function according to an embodiment of the present disclosure (hereinafter, referred to as a 'safety outlet') may be configured such that a power supply is performed while the plug 2 is fully mounted in a plug mounting portion 101.

In addition, the safety outlet 1 according to an embodiment of the present disclosure may be configured such that the plug 2 is inserted into and mounted in the safety outlet 1, and may be configured such that a one-touch function in which the plug 2 is automatically separated from the safety outlet 1 when the plug 2 is pressed again after the plug 2 is inserted into and mounted in the safety outlet 1.

In the safety outlet 1 according to an embodiment of the present disclosure, the safety outlet 1 may include a housing 100, a lifting plate 200, a safety switch module 300, a clutch member 400, a switch elastic member 500, a supporting elastic member 600, and a power terminal 700.

An external appearance of the safety outlet 1 may be formed by the housing 100 and the lifting plate 200, and the housing 100 and the lifting plate 200 may be combined and named as a housing coupling body.

The housing 100 may have an internal space in which the lifting plate 200, the safety switch module 300, the clutch member 400, the switch elastic member 500, the supporting elastic member 600, and the power terminal 700 are accommodated.

The plug mounting portion 101 in which the plug 2 is mounted may be formed in the housing 100.

The plug mounting portion 101 may be formed in a shape recessed into an inside of the housing 100 on a first surface of the housing 100 so that the plug 2 is inserted into and mounted in the plug mounting portion 101.

For example, the plug mounting portion 101 may be recessed downward from an upper surface of the housing 100.

The internal space of the housing 100 may include a lifting space 102 and a module arrangement space 103.

The lifting space 102 may be a space formed inside the plug mounting portion 101.

The module arrangement space 103 may be formed below the lifting space 102, and may be in communication with the lifting space 102.

The lifting plate 200 may include a lifting plate body portion 210, an extension portion 220, an upper clutch portion 230, and a guide portion 240.

The lifting plate body portion 210 covers the lifting space 102, and may be provided such that the lifting plate body portion 210 is lifted from inside the lifting space 102.

The lifting plate body portion 210 may be formed in a plate shape which corresponds to a cross-sectional shape of the lifting space 102 and which has a predetermined thickness.

A pin through hole 211 through which a pin of the plug passes therethrough may be formed vertically in the lifting plate body portion 210.

A plurality of pin through holes 211 may be formed corresponding to the number of pins of the plug.

The extension portion 220 may extend downward from a center of a lower surface of the lifting plate body portion 210.

The upper clutch portion 230 is provided so as to realize the one-touch operation of the lifting plate 200, and may be configured to interwork with a lower clutch portion 420 that will be described later.

The upper clutch portion 230 may be formed on a lower portion of the extension portion 220.

For example, the upper clutch portion 230 may be formed of a pair of upper clutch protrusions 231 that protrudes outwardly from a lower end circumference of the extension portion 220.

The guide portion 240 may be formed such that the guide portion 240 extends downward from the lower surface of the lifting plate body portion 210, and may be formed in a tubular shape having a hollow inner portion.

The guide portion 240 may be formed in a number corresponding to the number of the pin through holes 211, and may be disposed such that an inner portion of the guide portion 240 is in communication with the pin through hole 211.

That is, the guide portion 240 may be formed in a tubular shape that extends downward around a circumference of the pin through hole 211.

Meanwhile, components for smooth lifting and for preventing rotation of the lifting plate 200 may be formed in the lifting plate 200 and the housing 100.

For example, a guide protrusion 215 that protrudes outwardly may be formed in the lifting plate body portion 210, and a guide rail 105 recessed corresponding to the guide protrusion 215 such that the guide protrusion 215 is inserted into the guide rail 105 may be formed on an inner surface of the plug mounting portion 101.

The guide rail 105 may extend vertically corresponding to a movement path of the guide protrusion 215, the movement path according to the lifting of the lifting plate body portion 210.

Of course, a guide groove may be formed in the lifting plate body portion 210, and accordingly, a guide rail having a shape that protrudes such that the guide rail is capable of being inserted into the guide groove may be formed on the inner surface of the plug mounting portion 101.

Meanwhile, the safety switch module 300 may be configured to open and close an insertion path of a plug pin from inside the housing 100.

The safety switch module 300 may be configured to open the insertion path of the plug pin by being in contact with the plug pin that is normally inserted.

In addition, the safety switch module 300 may be configured to provide a switch function in which the entire of the safety switch module 300 is rotated by being in contact with the plug pin and the plug is caused to conduct current.

The safety switch module 300 may include a rotating case 310 and a conducting terminal member 350.

The rotating case 310 may be formed in a cylindrical column shape having a plurality of insertion ports that extends downward from an upper surface of the rotating case 310.

The rotating case 310 may be formed such that the rotating case 310 has an outer circumference larger than an inner circumference of the lifting space 102 so as to block a lower side opening of the lifting space 102.

In the rotating case 310, an extension portion insertion port 311 into which the extension portion 220 is inserted may be formed, and a pin insertion port 312 into which the pin of the plug is inserted may be formed.

A plurality of pin insertion ports 312 may be formed corresponding to the number of pins of the plug.

Hereinafter, for convenience of description, the safety outlet 1 which is applied to a plug having two pins and which has two pin insertion ports 312 will be described in detail, as an example.

The two pins of the plug may be respectively classified and named as a first plug pin and a second plug pin.

In addition, the two pin insertion ports 312 may be respectively classified and named as a first pin insertion port and a second pin insertion port.

The extension portion insertion port 311 and the two pin insertion ports 312 may be formed such that each circumference of the extension portion insertion port 311 and the two pin insertion ports 312 is completely partitioned so as to be sealed.

In addition, the extension portion insertion port 311 and the two pin insertion port 312 may be formed by vertically penetrating the rotating case 310 so as to realize drainage.

In addition, the pin insertion ports 312 may be formed such that each inner circumference of the pin insertion ports 312 corresponds to each outer circumference of the guide portions 240 so that the guide portions 240 are capable of being inserted into the pin insertion ports 312 when the lifting plate 200 is lifted downward.

A rotation guiding inclined surface 313 may be formed on the upper surface of the rotating case 310.

The rotation guiding inclined surface 313 may be formed such that the rotation guiding inclined surface 313 is in contact with the pin insertion port 312.

When a direction in which the rotating case 310 is rotated so as to open the insertion path of the plug pin is defined as an opening direction and a direction in which the rotating case 310 is rotated so as to block the insertion path of the plug pin is defined as a blocking direction, the rotation guiding inclined surface 313 may be disposed and formed on a side of the opening direction from the pin insertion port 312.

On the upper surface and the lower surface of the rotating case 310, a rotation guiding portion for guiding a rotation movement of the rotating case 310 may be formed.

In detail, an upper rotation guiding portion 315 that protrudes upward may be formed on an edge of the upper surface of the rotating case 310.

In addition, a lower rotation guiding portion 316 that protrudes downward may be formed on an edge of the lower surface of the rotating case 310.

The upper rotation guiding portion 315 and the lower rotation guiding portion 316 may protrude on an entire circumference of each edge of the upper and lower surfaces of the rotating case 310. In this case, the upper rotation guiding portion 315 and the lower rotation guiding portion 316 may be formed in ring shapes positioned on edges of the upper and lower surfaces of the rotating case 310.

Meanwhile, rotation guiding portion coupling portions to which each rotation guiding portion is coupled may be formed at positions corresponding to each rotation guiding portions inside the housing 100.

In detail, an upper surface of the module arrangement space 103 of the housing 100 may be formed such that the upper surface of the module arrangement space 103 is in contact with an upper surface edge of the rotating case 310.

In addition, a bottom surface of the module arrangement space 103 of the housing 100 may be formed such that the bottom surface of the module arrangement space 103 is in contact with the lower surface of the rotating case 310.

In addition, an upper rotation guiding portion coupling portion 106 into which the upper side rotation guiding portion 315 is inserted may be formed on the upper surface of the module arrangement space 103.

The upper rotation guiding portion coupling portion 106 may be formed in a groove shape corresponding to a shape of the upper rotation guiding portion 315 such that the upper rotation guiding portion 315 is capable of being inserted into the upper rotation guiding portion coupling portion 106.

In addition, a lower rotation guiding portion coupling portion 107 into which the lower rotation guiding portion 316 is inserted may be formed on the bottom surface of the module arrangement space 103.

The lower rotation guiding portion coupling portion 107 may be formed in a groove shape corresponding to a shape of the lower rotation guiding portion 316 such that the lower rotation guiding portion 316 is capable of being inserted into the lower rotation guiding portion coupling portion 107.

Therefore, the rotating case 310 may be restrained so that the rotating case 310 is not moved up and down in the module arrangement space 103.

In addition, when the rotating case 310 is rotated, the rotation guiding portions are moved along the rotation guiding portion coupling portions. Therefore, the rotating case 310 may be provided such that the rotating case 310 is capable of being rotated with respect to an imaginary vertical axis formed on a center of the rotating case 310.

Of course, in the embodiment described above, as an example, the rotation guiding portions are formed in protruding structures, and the rotation guiding portion coupling portions are formed in groove structures, but the present disclosure is not limited thereto. Furthermore, the rotation guiding portions may be formed in groove structures, and the rotation guiding portion coupling portions may be formed in protruding structures.

Meanwhile, the conducting terminal member 350 may include a pin contact terminal portion 351, a conducting terminal portion 352, and a connection portion 353.

A plurality of conducting terminal members 350 may be provided corresponding to the number of plug pins, and two conducting terminal members 350 may be provided as an example.

The two conducting terminal members 350 may be provided such that each of the two conducting terminal members 350 corresponds to each of the pin insertion ports 312.

The two conducting terminal members 350 may be respectively classified and named as a first conducting terminal member provided corresponding to the first pin insertion port and a second conducting terminal member provided corresponding to the second pin insertion port.

The pin contact terminal portion 351 may be disposed inside the corresponding pin insertion port 312.

The conducting terminal portion 352 may be disposed outside the rotating case 310.

In addition, the connection portion 353 may be configured such that the connection portion 352 penetrates an outer wall of the rotating case 310 and an inner wall of the pin insertion port 312 and electrically connects the conducting terminal portion 352 and the rotating case 310 to each other.

The pin contact terminal portion 351, the conducting terminal portion 352, and the connection portion 353 are conductors, and may be formed in an integral manner.

In an initial state in which the lifting plate 200 is lifted maximally upward, the pin contact terminal portion 351 is not in contact with the plug pin. In a state in which the lifting plate 200 is lifted maximally downward, the pin contact terminal portion 351 may be positioned at a height where the pin contact terminal portion 351 is capable of being in contact with the plug pin that is normally inserted.

Meanwhile, the clutch member 400 may be disposed inside the extension portion insertion port 311.

The clutch member 400 may be provided inside the extension portion insertion port 311 such that the clutch member 400 is capable of being rotated with respect to an imaginary vertical axis formed on a center of the clutch member 400.

The extension portion insertion port 311 may be formed vertically through the rotating case 310, and upper and lower end portions of the extension portion insertion port 311 may be stepped inwardly. That is, each inner circumference of the upper and lower end portions of the extension portion insertion port 311 may be formed narrower than an inner circumference of a center portion of the extension portion insertion port 311 where the clutch member 400 is disposed.

The clutch member 400 may be formed such that the clutch member 400 has an outer circumference corresponding to the inner circumference of the center portion of the extension portion insertion port 311.

Therefore, the clutch member 400 may be provided inside the extension portion insertion port 311 such that the clutch member 400 is capable of being restrained so that an up and down movement of the clutch member 400 is prevented, and may be provided such that the clutch member 400 is capable of being rotated with respect to a vertical axis in the center of the clutch member 400.

The clutch member 400 may be formed in a cylindrical shape open upwardly such that the extension portion 220 and the upper clutch portion 230 of the lifting plate 200 are capable of being inserted into the clutch member 400.

An internal space of the clutch member 400 may be in communication with the extension portion insertion port 311.

The lower clutch portion 420 interworking with the upper clutch portion 230 so as to realize the one-touch operation of the lifting plate 200 may be formed inside the clutch member 400.

Meanwhile, the switch elastic member 500 may provide a function of restoring the rotating case 310 to an initial state.

At this time, the initial state of the rotating case 310 may be defined as a state in which the rotation guiding inclined surface 313 is positioned corresponding to the pin through hole 211 such that the rotating case 310 is rotated and positioned so as to block the insertion path of the plug pin.

In the rotating case 310, when the plug pin passes through the pin through hole 211 and is in contact with the rotation guiding inclined surface 313 and then the plug is continuously pressed downward, the rotating case 310 may be rotated in the opening direction by the rotation guiding inclined surface 313.

At this time, when the rotating case 310 is rotated in the opening direction, the pin insertion port 312 is positioned corresponding to the pin through hole 211, so that the insertion path of the plug pin may be opened. Therefore, as the plug pin is inserted into the inner portion of the pin insertion port 312, the plug pin is capable of being in contact with the pin contact terminal portion 351 positioned inside the pin insertion port 312.

When the rotating case 310 is rotated in the opening direction, the switch elastic member 500 is elastically deformed, so that the switch elastic member 500 is capable of applying a rotational force such that the rotating case 310 is rotated in the blocking direction opposite to the opening direction.

For example, the switch elastic member 500 may be applied as a compression coil spring.

The switch elastic member 500 may be provided such that a first end of the switch elastic member 500 is fixed to the rotating case 310 and a second end of the switch elastic member 500 is coupled to the housing 100 so that the switch elastic member 500 is elastically deformed when the switch elastic member 500 is rotated in the opening direction.

Meanwhile, the supporting elastic member 600 may provide a function of restoring the lifting plate 200 to the initial state in which the lifting plate 200 is positioned at an upper end portion of the lifting space 102.

For example, the supporting elastic member 600 may be applied as a compression coil spring.

The supporting elastic member 600 is provided between the lifting plate 200 and the clutch member 400. Therefore, when the lifting plate 200 is lifted downward, the supporting elastic member 600 is compressed, thereby being capable of applying an upward force to the lifting plate 200.

In a state in which the lifting plate 200 is lifted downward, when the restraint of the lifting plate 200 is released by the elastic support of the supporting elastic member 600, the lifting plate 200 is restored to the initial state, so that the plug is capable of being easily removed.

In addition, as the lifting plate 200 is maximally lifted upward by the elastic support of the supporting elastic member 600, the initial state of the lifting plate 200 is capable of being maintained.

In detail, at the center of the extension portion 220, an elastic member insertion groove 225 recessed such that the supporting elastic member 600 is inserted into the elastic member insertion groove 225 may be formed.

In addition, an elastic member fixing portion 450 which protrudes from a center of a bottom surface of the clutch member 400 and to which a lower portion of the supporting elastic member 600 is fixed and which is inserted into the elastic member insertion groove 225 when the lifting plate 200 is lifted downward may be formed in the inner portion of the clutch member 400.

Meanwhile, the power terminal 700 is provided inside the housing 100, and may be electrically connected to an external power source.

The power terminal 700 may include a first power terminal 710 connected to the external power source of an L1 pole, and may include a second power terminal 720 connected to the external power source of an L2 pole.

The first power terminal 710 and the second power terminal 720 may be disposed outside the rotating case 310.

The power terminal 700 may be provided such that the power terminal 700 is optionally in contact with the corresponding conducting terminal member 350 according to the rotation direction of the rotating case 310.

For example, when the rotating case 310 is rotated in the opening direction, the first power terminal 710 may be in contact with the conducting terminal portion 352 of the first conducting terminal member. Furthermore, when the rotating case 310 is rotated in the blocking direction, the first power terminal 710 may be disposed such that the first power terminal 710 is spaced apart from the conducting terminal portion 352 of the first conducting terminal member. That is, the first power terminal 710 may be positioned on a movement path of the corresponding conducting terminal member 350 according to the rotation of the rotating case 310 in the opening direction.

In addition, when the rotating case 310 is rotated in the opening direction, the second power terminal 720 may be in contact with the conducting terminal portion 352 of the second conducting terminal member. Furthermore, when the rotating case 310 is rotated in the blocking direction, the second power terminal 720 may be disposed such that the second power terminal 720 is spaced apart from the conducting terminal portion 352 of the second conducting terminal member. That is, the second power terminal 720 may be positioned on a movement path of the corresponding conducting terminal member 350 according to the rotation of the rotating case 310 in the opening direction.

Meanwhile, in the housing 100, a drainage flow path 121 may be formed below the module arrangement space 103.

The drainage flow path 121 may be formed such that a plurality of drainage flow paths 121 is formed corresponding to the pin insertion ports 312 and the extension portion insertion port 311.

The plurality of drainage flow paths 121 may be classified into a first drainage flow path connected to the first pin insertion port, a second drainage flow path connected to the second pin insertion port, and a third drainage flow path connected to the extension portion insertion port 311.

The plurality of drainage flow paths 121 may be partitioned from each other so that liquid does not flow between the plurality of drainage flow paths 121.

A plurality of drainage holes 122 for being in communication with the drainage flow paths 121 corresponding to the pin insertion ports 312 and the extension portion insertion port 311 may be formed on the bottom surface of the module arrangement space 103.

The plurality of drainage holes 122 may be classified into a first drainage hole which is formed by forming an opening vertically below the first pin insertion port and which is in communication with the first drainage flow path, a second drainage hole which is formed by forming an opening vertically below the second pin insertion port and which is in communication with the second drainage flow path, and a third drainage hole which is formed by forming an opening vertically below the third pin insertion port and which is in communication with the third drainage flow path.

The first drainage hole and the second drainage hole may be formed in an arc shape and may extend along the movement path of the pin insertion ports 312 corresponding to the movement of the pin insertion ports 312 according to the rotation of the rotating case 310.

The plurality of drainage flow paths 121 may be formed such that the plurality of drainage flow paths 121 is open in directions different from each other at a lower circumference of the housing 100 so that liquid is drained in the different directions.

Therefore, liquid introduced into the extension portion insertion port 311 and the plurality of pin insertion ports 312 may be discharged to the outside of the safety outlet 1 along the corresponding drainage flow paths. At this time, since the liquid introduced into the extension portion insertion port 311 and the plurality of pin insertion ports 312 is not in contact with each other and is discharged in different directions along the drainage flow paths, so that an electric shock accident due to current flow may be effectively prevented.

Meanwhile, referring to FIG. 3 and FIG. 4, the housing 100 may be formed by a combination of an upper housing 110 and a lower housing 120.

The plug mounting portion 101, the lifting space 102, and the module arrangement space 103 may be formed on the upper housing 110.

In addition, the lower housing 120 may form the lower portion of the housing 100, and may be formed on the bottom surface of the module arrangement space 103.

In addition, the drainage flow paths 121 may be formed inside the lower housing 120, and the drainage holes 122 may be formed by forming openings on an upper surface of the lower housing 120.

In addition, the lower rotation guiding portion coupling portion 107 may be formed on the upper surface of the lower housing 120.

In a state in which the upper housing 110 and the lower housing 120 are separated from each other, the module arrangement space 103 may be open downward, and the safety switch module 300 may be inserted into and mounted in the module arrangement space 103.

In addition, by coupling the lower housing 120 to the upper housing 110, the lower side of the module arrangement space 103 is blocked, and the lower rotation guiding portion 316 may be coupled to the lower rotation guiding portion coupling portion 107.

Meanwhile, referring to FIG. 5 and FIG. 6, the rotating case 310 may be formed by coupling the upper rotating case 320 and the lower rotating case 330 to each other.

The upper rotating case 320 may form the upper portion of the rotating case 310.

In addition, the lower rotating case 330 may form the lower portion of the rotating case 310.

The upper rotating case 320 and the lower rotating case 330 may be coupled to each other by an adhesive, a fusion process, a hook coupling structure, and so on.

For example, the upper rotating case 320 may include an upper case body 321 having a cylindrical shape that is open downward.

In addition, the lower rotating case 330 may include a lower case body 331 having a cylindrical shape that is open upward.

The rotation guiding inclined surface 313 and the upper rotation guiding portion 315 may be formed on an upper surface of the upper case body 321.

In addition, the lower rotation guiding portion 316 may be formed on a lower surface of the lower case body 331.

In addition, upper openings of the pin insertion ports 312 and the extension portion insertion port 311 may be formed on the upper surface of the upper case body 321.

In addition, lower openings of the pin insertion ports 312 and the extension portion insertion port 311 may be formed on the lower surface of the lower case body 331.

In addition, pin insertion port connecting tubes connecting the upper openings and the lower openings of the pin insertion ports 312 and an extension portion insertion port connecting tube connecting the upper opening and the lower opening of the extension portion insertion port 311 may be formed inside the rotating case 310.

The pin insertion port connecting tubes are separated vertically and the extension portion insertion port connecting tube is separated vertically, and upper portions of the pin insertion port connecting tubes and an upper portion of the extension portion insertion port connecting tube are formed in the upper case body 321, and lower portions of the pin insertion port connecting tubes and a lower portion of the extension portion insertion port connecting tube are formed in the lower case body 331.

In detail, the pin insertion port connecting tubes may include upper pin insertion port connecting tubes 322 formed inside the upper case body 321, and may include lower pin insertion port connecting tubes 332 formed inside the lower case body 331.

The upper pin insertion port connecting tubes 322 and the lower pin insertion port connecting tubes 332 may be closely connected to each other since end portions of the upper pin insertion port connecting tubes 322 and end portions of the lower pin insertion port connecting tubes 332 are in close contact with each other when the upper case body 321 and the lower case body 331 are coupled to each other.

The extension portion insertion port connecting tube may include an upper extension portion insertion port connecting tube 323 formed inside the upper case body 321, and may include a lower extension portion insertion port connecting tube 333 formed inside the lower case body 331.

The upper extension portion insertion port connecting tube 323 and the lower extension portion insertion port connecting tube 333 may be closely connected to each other since an end portion of the upper extension portion insertion port connecting tube 323 and an end portion of the lower extension portion insertion port connecting tubes 333 are in close contact with each other when the upper case body 321 and the lower case body 331 are coupled to each other.

Meanwhile, a terminal mounting portion 335 in which the conducting terminal member 350 is mounted may be formed inside the rotating case 310.

The terminal mounting portion 335 may form a passage through which the connection portion 353 passes.

The terminal mounting portion 335 may be cut and formed in a shape corresponding to the shape of the connection portion 353.

For example, the terminal mounting portion 335 may be formed by recessing the upper surface of the lower rotating case 330 at a position where the connection portion 353 is disposed.

In detail, the terminal mounting portions 335 may be formed by recessing the lower pin insertion port connecting tube 332 and an upper surface of a circumferential surface of the lower case body 331.

The conducting terminal member 350 may be inserted into and mounted in the terminal mounting portion 335 while the upper rotating case 320 and the lower rotating case 330 are separated from each other.

In addition, when the upper rotating case 320 and the lower rotating case 330 are coupled to each other, the conducting terminal member 350 is fixed and coupled to the rotating case 310 and is capable of being rotated together with the rotating case 310.

In addition, in a state in which the upper rotating case 320 and the lower rotating case 330 are separated from each other, the clutch member 400 may be inserted into and mounted in the extension portion insertion port 311.

Meanwhile, referring to FIG. 7 and FIG. 8, the clutch member 400 may include a clutch body 410 having a tubular shape that is open vertically, the elastic member fixing portion 450 formed on a center of the clutch body 410, and the lower clutch portion 420 that protrudes from an inner circumferential surface of the clutch body 410.

The lower clutch portion 420 may include a rotation clutch portion 422 that protrudes inwardly from a lower portion of the clutch body 410, and a restraining clutch portion 421 that protrudes inwardly from a position spaced apart upward from the rotation clutch portion 422.

The rotation clutch portion 422 may connect the clutch body 410 and the elastic member fixing portion 450 to each other.

The rotation clutch portion 422 may be formed of a plurality of rotation clutch wings disposed radially with respect to a central axis of the clutch body 410.

The plurality of rotation clutch wings may be formed such that each upper surface of the plurality of rotation clutch wings is inclined toward a first rotation direction of the clutch body 410.

In addition, the restraining clutch portion 421 may be formed of a plurality of restraining clutch wings disposed radially with respect to the central axis of the clutch body 41.

The plurality of restraining clutch wings may be formed such that each upper surface of the plurality of restraining clutch wings is inclined toward the first rotation direction of the clutch body 410.

A separation space between the plurality of restraining clutch wings may be formed in a size such that the upper clutch protrusion 231 is capable of passing through the separation space.

The restraining clutch wings may be formed in a number less than the number of the rotation clutch wings.

The rotation clutch wing may be disposed vertically downward of the restraining clutch wings and vertically downward of areas between the restraining clutch wings.

When the lifting plate 200 is lifted downward, the upper clutch portion 230 may be lifted downward from inside the clutch body 410.

In addition, the upper clutch protrusion 231 may pass through the space between the restraining clutch wings and may be in contact with the rotation clutch wings.

In addition, the clutch member 400 may be rotated by a predetermined angle by contact between the upper clutch protrusion 231 and inclined surfaces of the rotation clutch wings.

By the predetermined angle rotation of the clutch member 400, the restraining clutch wings may be positioned vertically upward of the upper clutch protrusion 231.

In addition, when a force pressing the lifting plate 200 is released, the upper clutch protrusion 231 is in contact with lower surfaces of the restraining clutch wings, and the upper clutch protrusion 231 may be restrained by being caught by the restraining clutch wings. Therefore, the upper clutch protrusion 231 is restrained such that the lifting plate 200 is prevented from being lifted upward in a state in which the lifting plate 200 is lifted downward.

In addition, when the lifting plate 200 is lifted downward again by a pressing force, the upper clutch protrusion 231 and the inclined surfaces of the rotation clutch wings are in contact with each other, and the clutch member 400 may be rotated by a predetermined angle.

By the predetermined angle rotation of the clutch member 400, the space between the restraining clutch wings may be positioned vertically upward of the upper clutch protrusion 231.

Therefore, when a force pressing the lifting plate 200 is released, the lifting plate 200 is lifted upward to an initial position by releasing the restraint of the upper clutch protrusion 231, and the plug is capable of being easily separated.

That is, the one-touch operation of the safety outlet 1 may be realized.

Hereinafter, the overall operation of the safety outlet according to an embodiment of the present disclosure will be described in detail with reference to the drawings.

Figure 9:
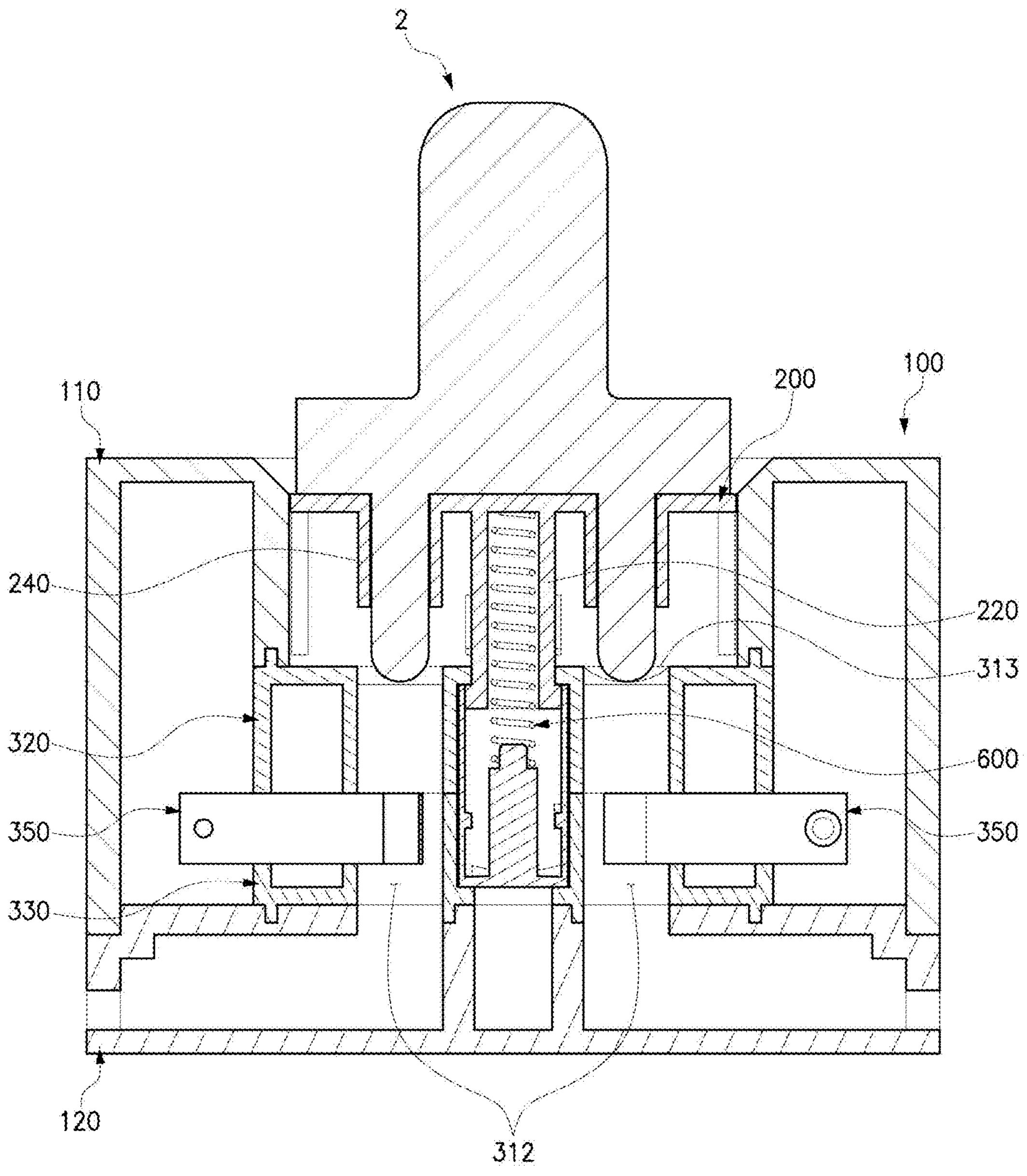
FIG. 9 is a cross-sectional view illustrating a state in which a plug is mounted while a lifting plate according to an embodiment of the present disclosure is maximally lifted upward.

FIG. 9 is a cross-sectional view illustrating a state in which a plug is mounted while a lifting plate according to an embodiment of the present disclosure is maximally lifted upward.

Figure 10:
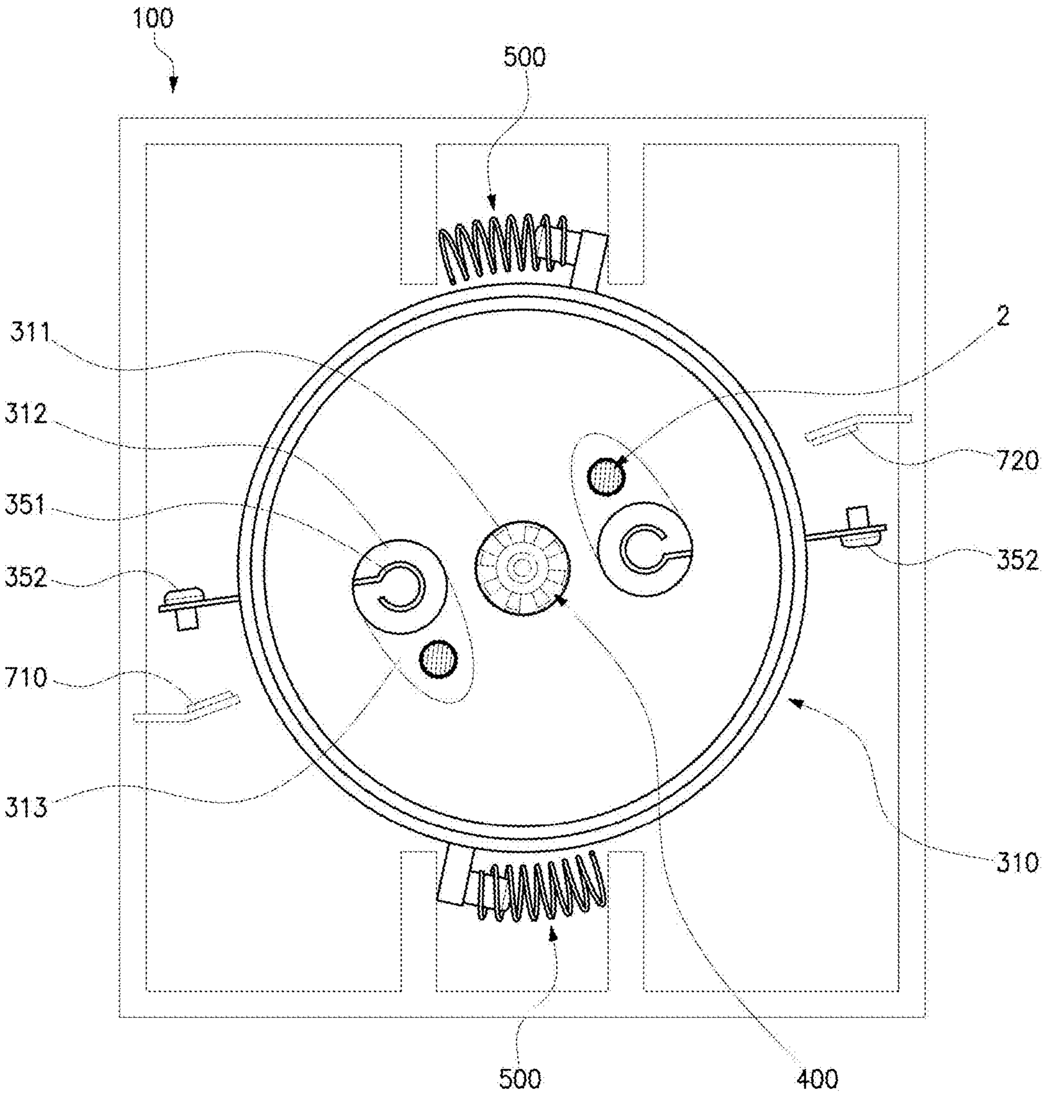
FIG. 10 is a view illustrating a state in which terminals in the state in FIG. 9 are spaced apart from each other and current flow is prevented.

FIG. 10 is a view illustrating a state in which terminals in the state in FIG. 9 are spaced apart from each other and current flow is prevented in the state in FIG. 9.

Figure 11:
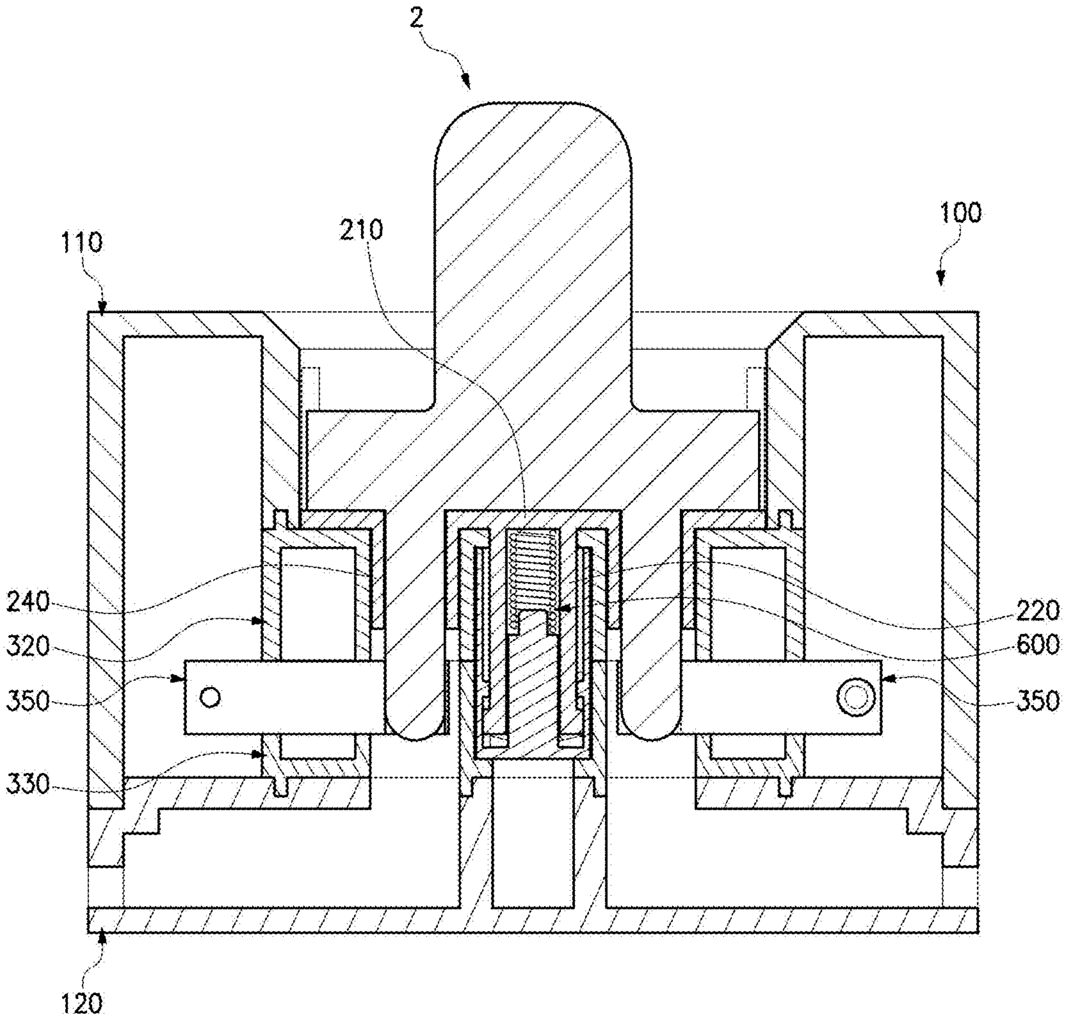
FIG. 11 is a cross-sectional view illustrating a state in which the lifting plate is lifted downward while the plug according to an embodiment of the present disclosure is mounted.

FIG. 11 is a cross-sectional view illustrating a state in which the lifting plate is lifted downward while the plug according to an embodiment of the present disclosure is mounted.

Figure 12:
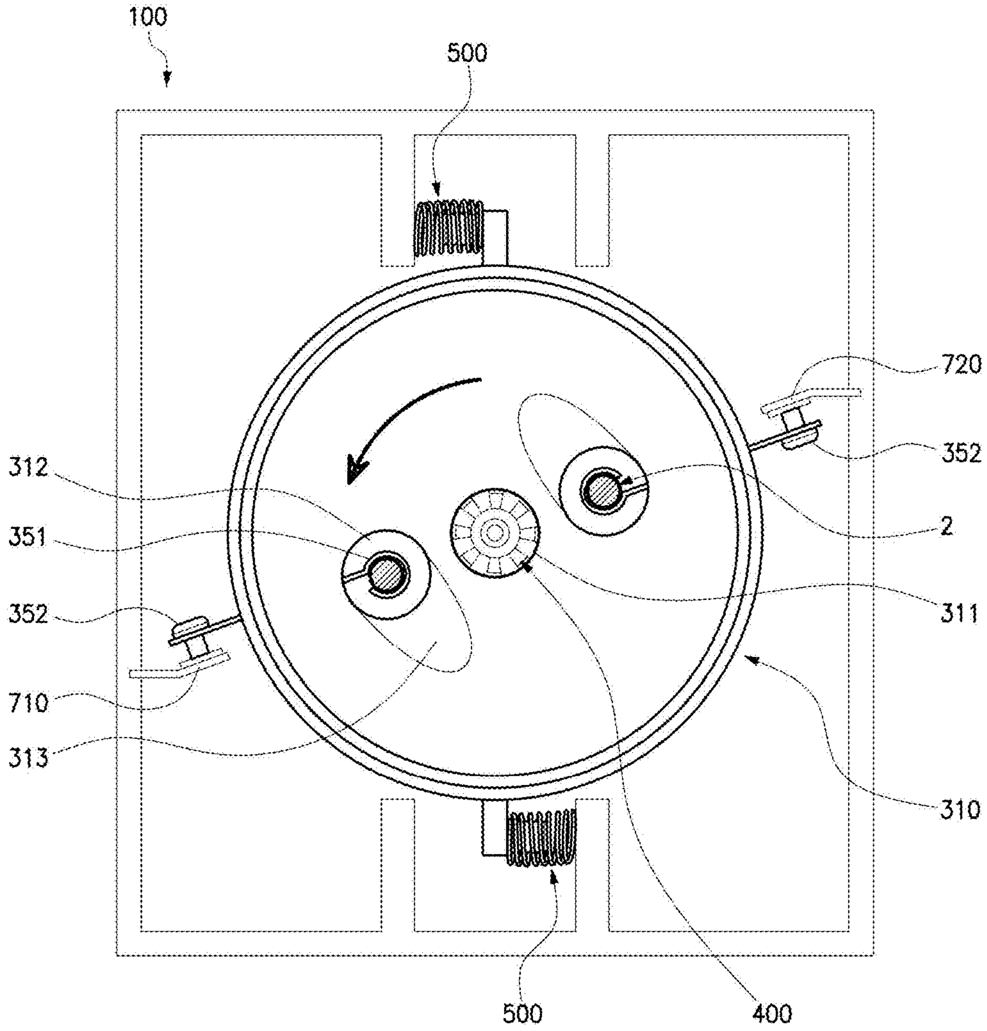
FIG. 12 is a view illustrating a state in which the terminals in the state in FIG. 11 are in contact with each other and current flow is realized.

FIG. 12 is a view illustrating a state in which the terminals in the state in FIG. 11 are in contact with each other and current flow is realized.

Figure 13:
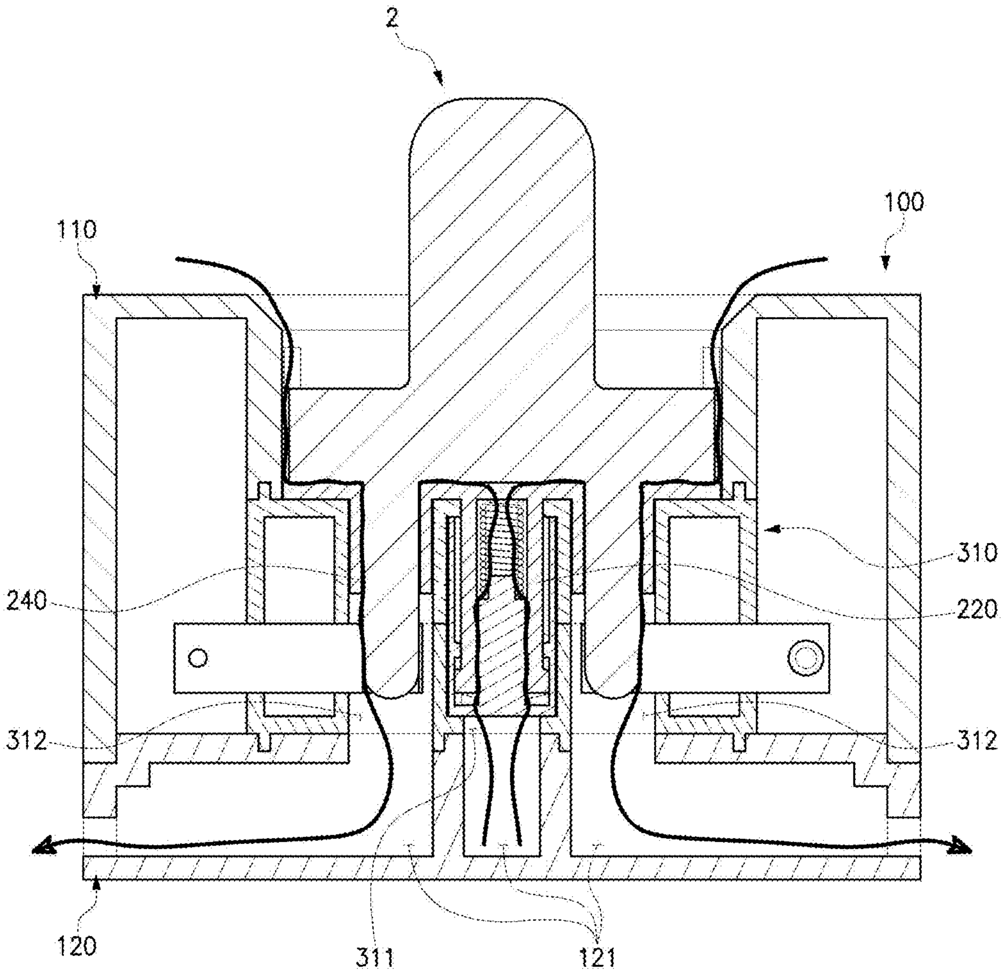
FIG. 13 is a view illustrating a drainage path according to an embodiment of the present disclosure.

FIG. 13 is a view illustrating a drainage path according to an embodiment of the present disclosure.

The pins of the plug may be inserted into the pin through holes 211 of the lifting plate 200 by a user.

In addition, the head of the plug may be in contact with the upper surface of the lifting plate 200.

At this time, the pins of the plug may be positioned outside the safety switch module 300.

In addition, the rotating case 310 may be rotated and positioned in the initial state, so that the pin insertion path may be in a state in which the pin insertion path is blocked.

In addition, the conducting terminal portion 352 of the conducting terminal member 350 and the power terminal 700 may be separated from each other and may be in a state of being powered off.

When an external force that presses the plug downward is applied, the lifting plate 200 may be lifted downward.

In addition, the pins of the plug may be in contact with the rotation guiding inclined surfaces 313 of the rotating case 310.

In a state in which the pins of the plug are in contact with the rotation guiding inclined surfaces 313, when the plug is continuously pressed downward, the rotating case 310 may be rotated in the opening direction.

At this time, the rotation of the rotating case 310 may be guided by the coupling structures between the upper rotation guiding portion 315 and the upper rotation guiding portion coupling portion 106 and between the lower rotation guiding portion 316 and the lower rotation guiding portion coupling portion 107.

When the pins of the plug are not inserted normally, or when only one of the two rotation guiding inclined surfaces 313 is pressed due to the insertion of foreign substances such as chopsticks, a lateralized force is applied to the rotating case 310. In this case, a rotation axis of the rotating case 310 may be tilted, and friction between the rotation guiding portions 315 and 316 and the rotation guiding portion coupling portions 106 and 107 may be increased, so that the rotation of the rotating case 310 may be prevented. Therefore, since the pin insertion path is not opened and the current flow is prevented, safety may be significantly increased.

When the pin insertion ports 312 are positioned such that the pin insertion ports 312 correspond to the pin through holes 211 by the rotation of the rotating case 310, the pin insertion path may be opened.

In addition, by the rotation of the rotating case 310 in the opening direction, the conducting terminal portion 352 of the conducting terminal member 350 and the power terminal 700 may be in contact with each other, so that a conductive state may be realized.

In addition, when the pin insertion path is opened, the lifting plate 200 may be maximally lifted downward by a force pressing the lifting plate 200.

In addition, the pins of the plug may be in a state in which the pins of the plug are maximally inserted into the pin insertion ports 312.

In a state in which the pins of the plug are maximally inserted, the pins of the plug may be caused to conduct current by being in contact with the pin contact terminal portions 351.

In addition, the upper clutch portion 230 may be in a state in which the upper clutch portion 230 is restrained by the clutch member 400. Therefore, the lifting of the lifting plate 200 may be restrained.

In addition, the switch elastic member 500 may be in an elastically deformed state such that the switch elastic member 500 applies a force in the blocking direction to the rotating case 310.

In addition, the supporting elastic member 600 may be in an elastically deformed state such that the supporting elastic member applies a force in an upward direction to the lifting plate 200.

In addition, the guide portions 240 of the lifting plate 200 may be in a state in which the guide portions 240 are inserted into the pin insertion ports 312.

As the guiding portions 240 are inserted into the pin insertion ports 312, the rotation of the rotating case 310 may be restrained, and liquid introduced through the pin through holes 211 may be stably guided to the pin insertion ports 312, so that an electric shock accident may be more effectively prevented.

Meanwhile, when the rotating case 310 is not rotated in the opening direction, the pin insertion ports 312 are not vertically aligned with the guide portions 240, so that an unnecessary downward lifting of the lifting plate 200 may be prevented since the interference between the guiding portions 240 and the upper surface of the rotating case 310 occurs.

Meanwhile, in a state in which the plug is completely mounted, when the plug is pressed again, the lifting plate 200 is capable of being pressed again.

In addition, as the lifting plate 200 is pressed again, the clutch member 400 may be rotated by the predetermined angle by interworking with the upper clutch portion 230.

In addition, the upward lifting restraint of the lifting plate 200 may be released.

In addition, as the upward lifting restraint of the lifting plate 200 is released, the lifting plate 200 may be lifted upward to the initial position by the elastic restoration force of the supporting elastic member 600.

In addition, as the lifting plate 200 is lifted upward, the pins of the plug are capable of being pulled out from the rotating case 310.

In addition, the rotating case 310 may be rotated in the blocking direction by the elastic restoration force of the switch elastic member 500.

In addition, as the rotating case 310 is rotated in the blocking direction, the contact between the power terminal 700 and the conducting terminal member 350 is released, so that a power cut off may be realized.

What is claimed is:

1. A safety outlet having a switch function, the safety outlet comprising:

a housing coupling body having a pin through hole into which a pin of a plug is inserted from above the pin through hole, the housing coupling body having an inner portion provided with a module arrangement space in communication with the pin through hole;

a safety switch module disposed in the module arrangement space, the safety switch module being configured to be rotated in a first direction by being in contact with the pin of the plug and by being pressed, thereby opening an insertion path of the pin of the plug;

a switch elastic member providing an elastic force such that the safety switch module is rotated in a second direction so as to block the insertion path; and a power terminal disposed outside the safety switch module from inside the housing coupling body and connected to an external power source, wherein the safety switch module comprises:

a rotating case having a pin insertion port which is open upward and into which the pin of the plug is inserted, having an upper surface provided with a rotation guiding inclined surface in contact with the pin insertion port, being initially positioned such that the rotation guiding inclined surface corresponds to the pin through hole, and being configured to be rotated in the first direction by contact between the pin of the plug and the rotation guiding inclined surface and by being pressed so that the pin insertion port corresponds to the pin through hole; and a conducting terminal member coupled to the rotating case and configured to be rotated together with the rotating case, the conducting terminal member having a first end which is positioned inside the pin insertion port and which is in contact with the pin of the plug that is inserted, the conducting terminal member having a second end which penetrates a side wall of the rotating case and which is positioned outside the rotating case, and the conducting terminal member being configured to be caused to conduct current by being in contact with the power terminal when the rotating case is rotated in the first direction.

2. The safety outlet of claim 1, wherein a rotation guiding portion that protrudes along each edge circumference of the upper surface and a lower surface of the rotating case is formed on the upper surface and the lower surface of the rotating case, a rotation guiding portion coupling portion coupled to the rotation guiding portion is formed on an upper surface and a bottom surface of the module arrangement space, and one of the rotation guiding portion and the rotation guiding portion coupling portion is formed as a groove having a circular shape, and the other one of the rotation guiding portion and the rotation guiding portion coupling portion is formed as a protrusion having a circular shape inserted into the groove.

3. The safety outlet of claim 1, wherein the pin insertion port is formed such that a plurality of pin insertion ports is formed corresponding to the number of pins of the plug and is formed vertically through the rotating case, the conducting terminal member is provided such that a plurality of conducting terminal members is provided corresponding to the number of the plurality of pin insertion ports, a plurality of drainage flow paths partitioned from each other is formed below the rotating case inside the housing coupling body, the plurality of pin insertion ports is respectively in communication with the drainage flow paths different from each other, and the plurality of drainage flow paths is open outside toward directions different from each other from a lower portion of the housing coupling body such that liquids introduced into the pin insertion ports different from each other do not in contact with each other.

4. The safety outlet of claim 1, wherein the housing coupling body comprises:

a housing in which a lifting space that is open upward is formed and the module arrangement space is formed below the lifting space;

a lifting plate provided in the lifting space such that the lifting plate is capable of being lifted, the lifting plate being configured to be lifted downward by being pressed by the plug when the plug is mounted, and the lifting plate having the pin through hole; and a supporting elastic member elastically supporting the lifting plate from inside the housing, the supporting elastic member being configured to be elastically deformed when the lifting plate is lifted downward, thereby providing an upward restoration force to the lifting plate.

5. The safety outlet of claim 4, wherein the lifting plate comprises:

a lifting plate body portion having a plate shape and having the pin through hole formed through the lifting plate body portion;

an extension portion that extends downward from a center of a lower surface of the lifting plate body portion; and an upper clutch portion formed on a lower portion of the extension portion and configured to realize a one-touch operation of the lifting plate, and an extension portion insertion port into which the extension portion is inserted when the lifting plate is lifted downward is formed on a center of the rotating case, and a clutch member interworking with the upper clutch portion so as to realize the one-touch operation of the lifting plate and repeating restraining of the upper clutch portion and releasing the restraining of the upper clutch portion according to a repeated pressing of the lifting plate is provided in the extension portion insertion port.

* * * * *